United States Patent Office 3,447,863
Patented June 3, 1969

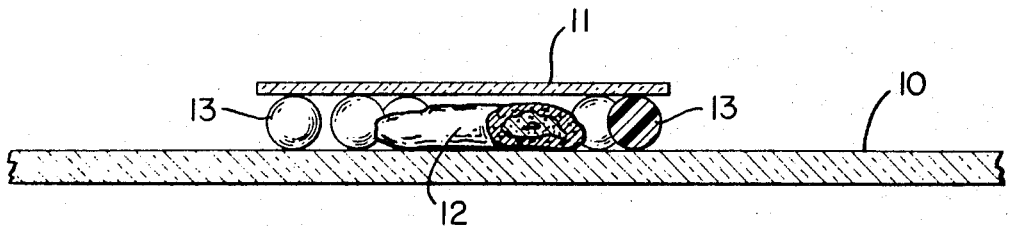
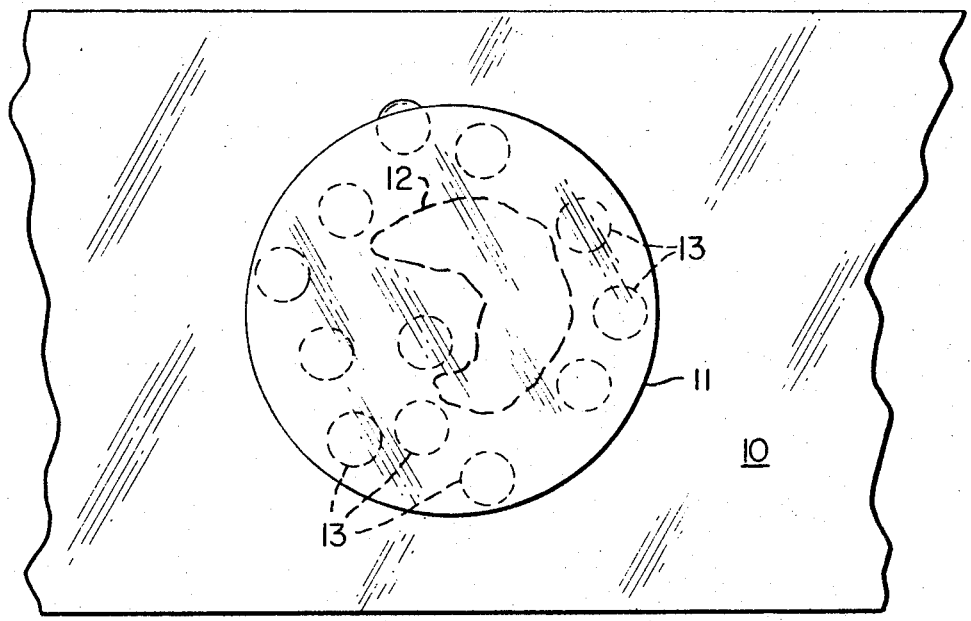

3,447,863
METHOD FOR PREPARING A SLIDE FOR VIEWING
James A. Patterson, Los Altos, Calif., assignor to Sodell Research & Development Company, Palo Alto, Calif.
Filed July 11, 1966, Ser. No. 564,411
Int. Cl. G02b 21/34
U.S. Cl. 350—320                                    7 Claims

ABSTRACT OF THE DISCLOSURE

A method for preparing a slide for viewing a specimen in fluid wherein spacer beads formed from cross-linked polymers (styrene-divinyl benzene) are inserted between a microscope slide and cover therefor surrounding the specimen and held in place by capillary attraction.

---

This invention relates to microscope slides and, particulary, to maintenance of a desirable spacing between the slide and a cover slip or plate which may be placed thereover with a sample in position for viewing.

In the preferred embodiment, the gist of the invention lies in the use of a plurality of cross-linked polymeric beads of substantially uniform diameter. The beads may be of microscopic size and are placed on the slide as spacers which support the cover slip or plate above the slide a distance equal to the diameter of the beads. The bead diameters are selected with the size of the samples to be viewed in mind. The bead diameters may be about equal to or slightly larger than the thickness of the main mass of the sample to be viewed so that the cover prate is supported above the sample. Alternatively, the bead diameters may be slightly smaller than the thickness of the sample so that a known and repeatable amount of contact pressure is developed between the cover plate and sample. Various size beads can be made available to accommodate differing sample characteristics and sizes. The beads can be positioned as desired on the slide to avoid any interference or obstruct ions to vision relative to the sample.

In the accompanying drawing:
In FIG. 1 there is shown in a schematic side sectional view a slide and cover slip sandwich, including polymeric bead spacers in accordance with the present invention;
FIG. 2 is a segment of a top elevational view of the embodiment illustrated in FIG. 1.

The principal reason for using spacers in accordance with the present invention is to avoid unknown and variable pressures applied by the cover plate against the sample or specimen which is on the slide. The pressure from the cover plate is more than just the weight pressure of the cover plate. Considering that the specimen such as a biological specimen is normally placed on the slide with a certain amount of fluid surrounding it, the cover slip is subjected to capillary attraction forces caused by the capillary space between the cover plate and the slide surface. Depending upon the condition of the normally glass surfaces of the slide and cover plate and the properties of the liquid media employed, a capillary force is present which is quite variable and may be relatively large. The forces developed are capable of distorting specimens on the slide. In addition, samples mounted between the two surfaces will be under varying degrees of compression from slide to slide since, for practical purposes, the variables giving rise to the capillary attraction forces will vary from slide to slide.

This variation of the amount of compressive force applied to samples has caused a great deal of confusion in identification of biological samples and in some cases has actually caused researchers to pursue further research based upon erroneous assumptions. The present technique provides a selection of spacers that will be constant from slide to slide so that a known constant level of force will be applied to each sample investigated, provided only that the size of the sample particle is known and remains constant.

There have been previous attempts to regulate the spacing and pressures applied by cover plates to samples on microscope slides. Such attempts have employed a slide having a raised perimeter or wall around the area within which the sample was to be placed. The cover slip was supported around its perimeter on this wall. This type of a slide involves practical problems of manufacturing the slides so that the wall is, in fact, of uniform height about its entire perimeter and that the uniformity is repeated from slide to slide. In addition, the uniformity is quickly destroyed with use. Perhaps the most serious shortcoming is the lack of a provision for supporting the cover plate at any place except about the perimeter. Where the forces are great enough to cause distortion of the cover plate and sample, they cause the cover plate to distort in its unsupported central area and result in the same type of problems in the central unsupported regions as in the case where no support for the cover plate is used at all.

In the accompanying drawing, the microscope slide and cover plate sandwich of this invention includes the usual slide 10 which is generally made from glass and a cover slip or plate 11, also usually of glass, disposed thereover. Between the slide 10 and the cover plate 11, a sample 12 is disposed. In accordance with the present invention, a plurality of cross-linked polymeric beads, such as beads 13, are disposed between the slide and cover plate 11 to support the cover plate 11. As seen most easily in FIG. 2, beads 13 are easily inserted and positioned so that cover plate 11 can be supported at a plurality of points to substantially prevent any bending and spacing closer than the bead diameters due to capillary attraction forces.

The beads are of substantially uniform diameters so that the cover plate is supported at the appropriate constant distance throughout its surface area. The diameters are selected depending upon the type of sample or specimen involved. For example, rabbit ova are about 125 microns in diameter and include a cloud of surrounding cells. With such a specimen, a preferred mounting might utilize a slide and cover plate where the adjacent two glass surfaces are spaced exactly 120 microns apart. With such spacing the floating surface or surrounding cells would be forced aside to just expose the ova nucleus under the compression of a 5 micron wedge. This compressive force would also serve to hold the ova in position. Forces greater than this 5 micron wedge force tend to extend the ova and cause it to rupture. Excessive forces may also create false appearances of biological stimulation which may mislead the observer and cause erroneous conclusions. With the present spacers, either no compressive forces, or a controlled small force which is easily repeated from sample to sample, is obtained.

In the preferred embodiment, the beads are prepared by cross-linking polymers of the type that are resistant to shape changing forces and which are particularly resistant to compressive forces. Suitable polymers for present purposes have been described in U.S. Patent No. 2,366,007, to D'Alelio. These copolymers are formed by a conventional catalyzed polymerization reaction and are made from a monovinyl aryl compound such as styrene (vinyl benzene), vinyl toluenes, vinyl naphthalenes, vinyl ethyl benzenes, alpha-methyl styrene, vinyl chlorobezenes and vinyl xylenes. The selected monomer is cross-linked with a suitable polyvinyl aryl compound, such as the divinyl benzenes, divinyl toluenes, divinyl naphthalenes, divinyl exylenes, divinyl ethyl benzenes, divinyl chlorbenzenes and divinyl-phenyl vinyl ethers. Preferred beads for present purposes are made from polystyrene cross-linked with divinly benzene. Such beads are commercially available in a variety of sizes wherein a quantity of beads of any particular size are of uniform diameters from Microspheres Inc. of Palo Alto, Calif., under the trademark Micule.

The beads can be inserted per se on the slide or, if convenient, the beads can be premixed in a suitable carrier fluid such as a non-swelling oil or aqueous media prior to use, in which case the beads can be placed on the slide in combination with the fluid carrier media. With biological specimens, an aqueous or mixture containing water, and frequently an alcohol, is commonly used for storing the specimens. If the specimen is placed on the slide with some of this aqueous fluid, the carrier fluid for the beads should preferably be compatible with the specimen's fluid.

In all cases, it is important that the fluid in which the beads are carried or the fluid in which the specimen is stored should not cause swelling of the beads. The reason for this requirement is apparent. The beads have been manufactured and accurately sized. Any uncontrolled changes from the initial dimensions of the beads would be at least in part defeat the purposes of the invention. Cross-linked resins made from aromatic monomers of the type mentioned above are generally resistant to swelling from all of the fluids normally encountered with biological samples, and in general will remain constant in aqueous or aqueous mixture type media. In those instances where an aromatic solvent such as benzene or a halogenated aliphatic solvent is present, other types of beads may be required to resist swelling. In this case beads of the cross-linked type mentioned above can be utilized provided they include ionic groups fixed in the polymer lattice. This latter type of solvent is unusual in the art here of concern and in most cases the simple non-ionic cross-linked aromatic bead will serve very well. All of the cross-linked polymers, with or without the ionic groups, are of the type which resist compressive forces of the magnitude involved and will not deform under the conditions present between the slide and cover plate.

As further refinements in the present invention, it is contemplated that the beads can be labeled for easy identification. For example, the bead can contain a coloring so that it is quickly detectable under the microscope and differentiated from the sample or specimen being viewed. Another alternative is to utilize beads of the type above described which also include a magnetically attractive outer coating such as a metal layer. Polymer beads containing such metal coatings are described in copending patent application, Ser. No. 613,136, filed Feb. 1, 1967. Where beads contain a magnetically attractive outer layer they can be controlled and positioned as desired on the slide with the use of suitable magnetic forces applied adjacent to the slide. For example, conventional micromanipulators can be utilized to move metal coated beads on the slide into any position desired.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. An improved method for preparing a slide for viewing comprising: providing a slide and cover plate, positioning a sample to be viewed on said slide, disposing a plurality of substantially uniformly sized beads adjacent to said sample, said beads having a preselected diameter relative to the sample thickness and being formed from a cross-linked polymer of the type that is resistant to compressive forces, and placing said cover plate over the beads and sample so that the cover plate is supported by said beads, said sample being in fluid on said slide so that capillary attraction holds the beads, slide, and cover plate in a relatively fixed position.

2. A method in accordance with claim 1 wherein said polymer is the product of cross-linking a monovinyl aryl compound with a polyvinyl aryl compound.

3. A method in accordance with claim 2 wherein said monovinyl aryl compound is styrene and said polyvinyl aryl compound is divinyl benzene.

4. A method in accordance with claim 1 wherein said beads are labeled for identification.

5. The method in accordance with claim 1 wherein said beads are supplied in a non-swelling fluid media preparatory to disposition adjacent said sample and the beads are disposed on the slide in combination with said fluid media.

6. The method in accordance with claim 1 wherein said sample is a biological sample and is supplied in a fluid containing water, and said bead is formed from an aromatic cross-linked polymer that is non-swellable in aqueous fluids.

7. The method in accordance with claim 1 wherein said beads contain a magnetically attractive outer layer, and including the step of moving selected beads on said slide with a source of magnetic forces.

References Cited

UNITED STATES PATENTS

| 1,313,962 | 8/1919 | Spindler | 350—94 |
| 2,776,596 | 1/1957 | Eigen | 350—95 X |
| 3,198,064 | 8/1965 | Moore. | |
| 3,220,300 | 11/1965 | Von Huene. | |
| 3,234,595 | 2/1966 | Weichselbaum, et al. | 350—92 X |
| 3,285,127 | 11/1966 | Piller | 350—95 X |
| 2,731,879 | 1/1956 | Conover. | |

DAVID SCHONBERG, *Primary Examiner.*

PAUL R. GILLIAM, *Assistant Examiner.*

U.S. Cl. X.R.

350—95